United States Patent [19]

Richardson

[11] Patent Number: 4,914,556
[45] Date of Patent: Apr. 3, 1990

[54] SPECTRAL FILTER MODULE
[75] Inventor: Brian E. Richardson, San Jose, Calif.
[73] Assignee: Morpheus Lights, Inc., San Jose, Calif.
[21] Appl. No.: 224,436
[22] Filed: Jul. 26, 1988
[51] Int. Cl.$^4$ .......................... F21V 9/00; G02B 5/22
[52] U.S. Cl. ................................... 362/293; 362/277; 362/283; 350/314; 350/315; 350/316
[58] Field of Search ...................... 362/277, 283, 293; 350/314, 315, 316

[56] References Cited

U.S. PATENT DOCUMENTS

| | | | |
|---|---|---|---|
| 2,416,919 | 3/1947 | Goldsmith | 350/314 X |
| 2,822,729 | 2/1958 | Capatosto | 350/315 |
| 3,195,405 | 7/1965 | Clark et al. | 350/314 X |
| 3,260,152 | 7/1966 | Aston | 350/314 X |

Primary Examiner—Allen M. Ostrager
Attorney, Agent, or Firm—Rosenblum, Parish & Bacigalupi

[57] ABSTRACT

Spectral filter means in which filter elements have elongated planar surface areas covered with patterns of filtering material. Filter elements are independently movable parallel to their respective surface planes to positions where a given density pattern of filtering material is intersected by a beam of light and filters a given component of the light. Separate filter elements for each of the primary colors and an additional element for dimming all colors are used to control the color and intensity of a beam of light.

20 Claims, 4 Drawing Sheets

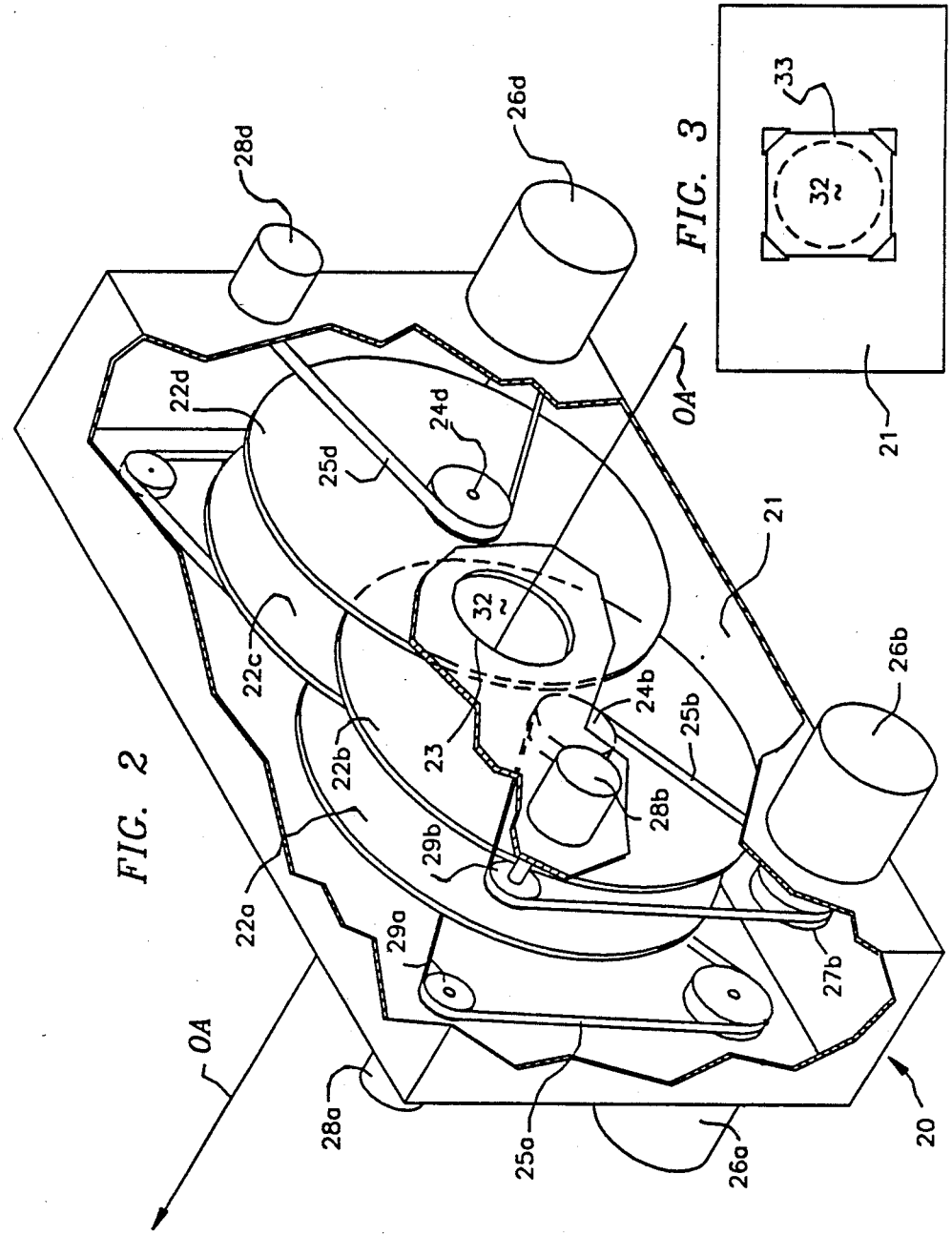

SPECTRAL FILTER MODULE

BACKGROUND OF THE INVENTION

1. Field of the Invention

The present invention relates generally to optical filtering systems and more particularly to an improved filtering system for controlling the color of light projected by a spot light or the like.

2. Discussion of the Prior Art

Conventional lighting systems have been provided with replaceable filters for modulating the color and/or intensity of light projected through the filters. U.S. Pat. No. 3,411,847 describes a photographic film developing system which passes a beam of white light through filters which each uniformly attenuates a respective primary color. The filters are individually positioned to be intersected by the beam during fractions of a film developing interval which are proportional to the fraction of that color in the average desired color of the light over the entire interval. The filtered light is differently colored during different fractions of the interval and typically at no one instant has the desired color.

U.S. Pat. No. 4,459,014 describes a system of three unspecified or uniform density primary color filters which are individually and constantly positioned in parallel so that they are intersected by light in a proportional crosssectional area of a beam while white light passes in the unfiltered remaining area of the beam. The downstream beam has the desired average color but its color intensity is non-uniformly distributed and inefficient to diffuse.

U.S. Pat. No. 4,600,976 describes a comparable mechanism in which multiple unspecified (uniform) density primary color filters are individually rotatable in parallel planes to be intersected by proportional areas of a light beam, and thereby yield a downstream beam that also has the desired overall average color but with a non-uniform intensity distribution, which again requires substantial diffusion.

In U.S. Pat. No. 4,602,321 each of three sets of filters include filter elements with respective planar surfaces which are uniformly covered with dichroic filtering material. The filter elements are rotatable around axes in their respective surface planes to positions oblique to the optical axis of the beam. This produces a downstream beam with a selected one of various colors distributed generally uniformly. However, dichroic filters being rotated about axes non-normal to their surfaces affect different spectra of light along the beam axis. This limits the possible colors and/or intensities producable with filters of given colored sets of filter elements.

There remains therefore a need for a spectral filter for selectively, continuously, uniformly, and conveniently varying the spectral composition of a beam of light projected through the filter.

SUMMARY OF THE PRESENT INVENTION

It is therefore a primary objective of the present invention to provide an improved means for controlling the spectral composition of light in a beam projected through a lighting system.

Another objective of the present invention is to provide a means for generally uniformly filtering light across the area of a beam.

Still another objective of the present invention is to provide means for conveniently and efficiently producing a selected color of light.

Briefly, a preferred embodiment of the present invention includes a component color filter element formed from a substrate having an elongated planar area having discrete regions located in interstices of a connected background region, either of which are covered with a predetermined density pattern of filtering material. In one embodiment the filtering material average density varies generally uniformly in beam-size areas around successive points along the length of a gradient axis through the elongated area. A plurality of different color filter elements may be positioned for selected areas of the various elements to be intersected by, and to filter predetermined proportions of the spectrum of, beam. A filter module according to a preferred embodiment of the invention uses three component color filter elements with filtering material for filtering respective primary colors and uses a fourth filter element with filtering material for dimming the intensity of all colors.

Among the advantages of the present invention are that each component color filter yields a beam having that filter's color distributed with a selected and uniform or relatively uniform intensity across the area of the beam, which requires less diffusion and wastes less light than prior art light color filters.

These and others objects of the present invention will become apparent to those skilled in the art upon reading the following detailed description of the preferred embodiments which are shown in the several figures of the drawing.

BRIEF DESCRIPTION OF THE DRAWING

FIG. 2 is an isometric view showing further details of the filter module of FIG. 1;

FIG. 3 is a rear view of the filter module of FIGS. 1 and 2;

DETAILED DESCRIPTION OF THE PREFERRED EMBODIMENTS

Figure 1:
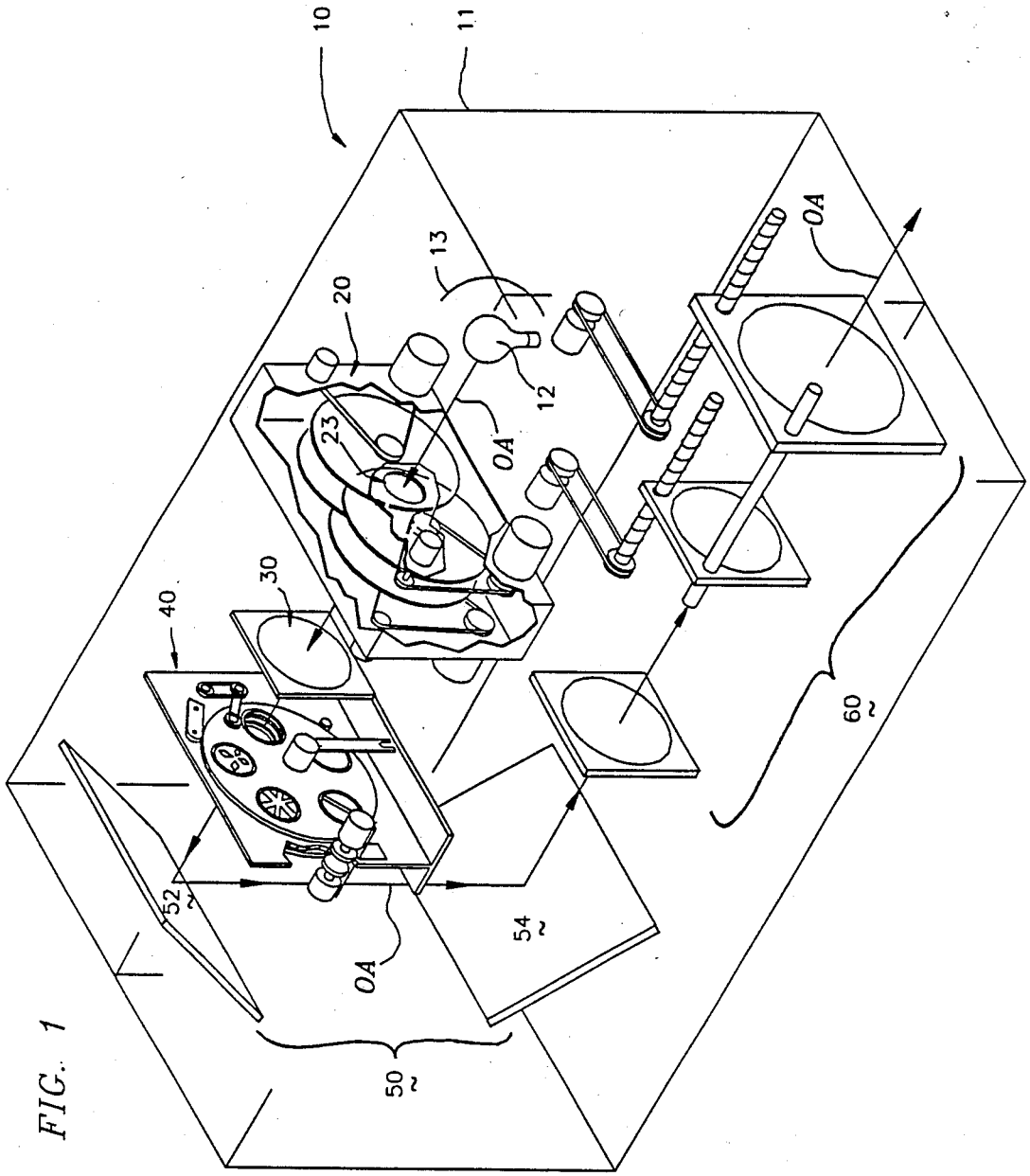
FIG. 1 is a partially cut away isometric view of a lighting system including a preferred embodiment of a spectral filter module according to the present invention.

Referring to FIG. 1 the present invention is preferably embodied in a spectral filter module 20 as illustrated in use in a spot light projection system 10. System 10 is supported by suitable brackets (not shown) within a housing 11 (shown in schematic outline) and includes a light source, preferably an arc lamp 12 with a reflector 13, which radiates white light (leftward in FIG. 1) along optical axis OA. The radiated light is preferably filtered through a conventional "hot filter" (not shown) which removes infra-red and ultra-violet light while passing visible light. Referring also to FIG. 2, the light then enters module casing 21 through front opening 23, passes as a beam in generally cylindrical region 32 through module 20, exits module casing 21 from its back side and passes through a diffusor 33, preferably an acid-etched glass plate, mounted on the back side of module casing 21 as shown in FIG. 3.

In system 10 the filtered light beam then travels through a condenser lens 30 which directs the light along axis OA. At a focal plane of the system of lenses 30 and 60 the beam is optionally passed through selectable aperture module 40 as further described in Applicant's co-pending application Ser. No. 224,438 filed 07/26/88.

The beam, which may also be reflected by an optional beam folding (mirror) means 50, finally traverses triplet lens system 60 which projects the beam from system 10 along axis OA. To direct the beam as desired, housing 11 may be vertically tilted and/or horizontally panned on gimbal joints as further described in Applicant's co-pending application Ser. No. 224,437 filed 07/26/88.

Spectral filter module 20 is preferably positioned with cylindrical region 32 centered around axis OA elsewhere than in a focal plane of triplet lens 60. Although FIG. 1 shows module 20 positioned upstream of lens 30, it is alternately possible to position module 20 either downstream of lens 30, downstream of selectable aperture module 40, downstream of beam folding mirror 52 or mirror 54, or between lenses in triplet lens 60.

As further shown in FIG. 2, filter module 20 comprises four spectral component filter elements 22(*a, b, c* and *d*). Each filter element 22 is independently movable in directions parallel to the plane of its surface. Filter elements 22 are preferably disposoed in respective parallel-spaced planes normal to optical axis OA, although the filter elements do not necessarily have to be mounted coaxially or even in parallel. For example in alternate embodiments of a filtering module each filter element could be mounted to rotate about a respective axis of rotation non-parallel to the axes of rotation of the other elements. In module 20 filter elements 22*a*, 22*b*, 22*c* and 22*d* are grouped in one pair of disks (22*a* and 22*b*) having respective coaxial hubs of which one is shown at 24*b*, and in another pair of disks (22*c* and 22*d*) having respective coaxial hubs of which one is shown at 24*d*. The pairs of disks overlap in cylindrical region 32.

In module 20, each disk hub 24 has a respective pulley turned by a belt 25 which is driven by a motor 26 through a pulley 27. Motors 26 may be direct current analog servo-motors controlled by feedback from respective potentiometers 28, or digital stepper motors without feedback control. In the case of analog servo-motors, the angular position of each disk 22 is sensed by a respective potentiometer 28 with a pulley 29 turned by a belt 25.

Each filter element comprises regions of filtering material which may be formed in or on a substrate. The substrate may be opaque in alternate embodiments (not shown) that only allow using reflected light, but is preferably transparent, for example comprising a glass such as Pyrex (R), in embodiments that allow using either reflected or transmitted light. Alternately, the substrate could have discrete void regions in interstices of a background region of filtering material.

Figure 4:
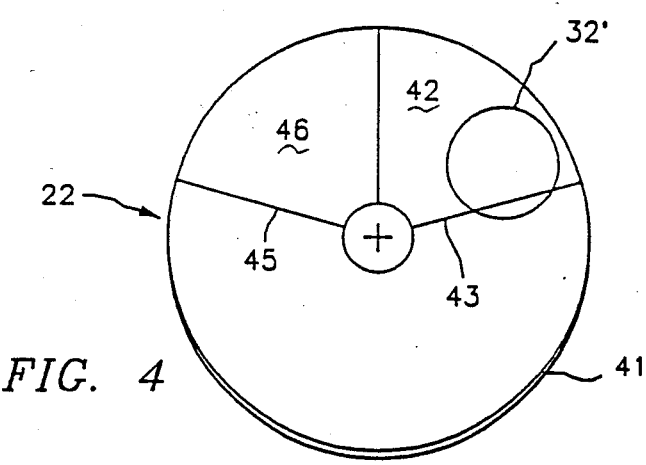
FIG. 4 is an isometric illustration of a filter element in an embodiment as a disk-shaped substrate with an arcuate gradient axis and being partially covered with filtering material.

Each substrate has an elongated planar surface area preferably coated with filtering material in a pattern the average density of which determines the attenuation of light intersecting different areas of the filter. The pattern density may be constant to attenuate light by a predetermined constant amount, or may vary through pattern areas around successive points along a gradient axis to attenuate light by predetermined varying amounts. In the preferred embodiment as shown in FIG. 4, disk-shaped substrate 41 has a planar side surface divided into three sectors 42, 44 and 46. Relatively transparent end portion 42 is not covered with filtering material and when positioned to be intersected by the beam, passes the entire spectrum of visible light. In each disk 22, patterned sector 44 is partially covered with filtering material in a progressively denser pattern which begins with a low average density in a beam-size area around a point at radial boundary 43 and, as will be further described below, becomes nearly solid as it approaches radial boundary 45. Sector 46 is solidly covered with the filtering material. The pattern of filtering material progressing from radius 43 preferably increases in average density with the square of the arcuate gradient axis length, so that light filtering increases linearly with the arcuate gradient axis length, around the disk towards radius 45. In the preferred embodiment of the filter module, three filter elements 22 are partially covered with color-specific material for filtering respective primary colors while a fourth element 22 is partially covered with opaque material for attenuating the intensity of all colors in a beam of a light. The preferred filtering media is a coating of dichroic material, available for example from the Optical Coating Laboratory Inc. of Santa Rosa, CA., or from the Corion Corporation of Holliston, Mass. The dichroic filtering material may be patterned using a positive or negative photoresist or metal mask formed before or after the dichroic material is deposited on the substrate surface.

Figure 5:
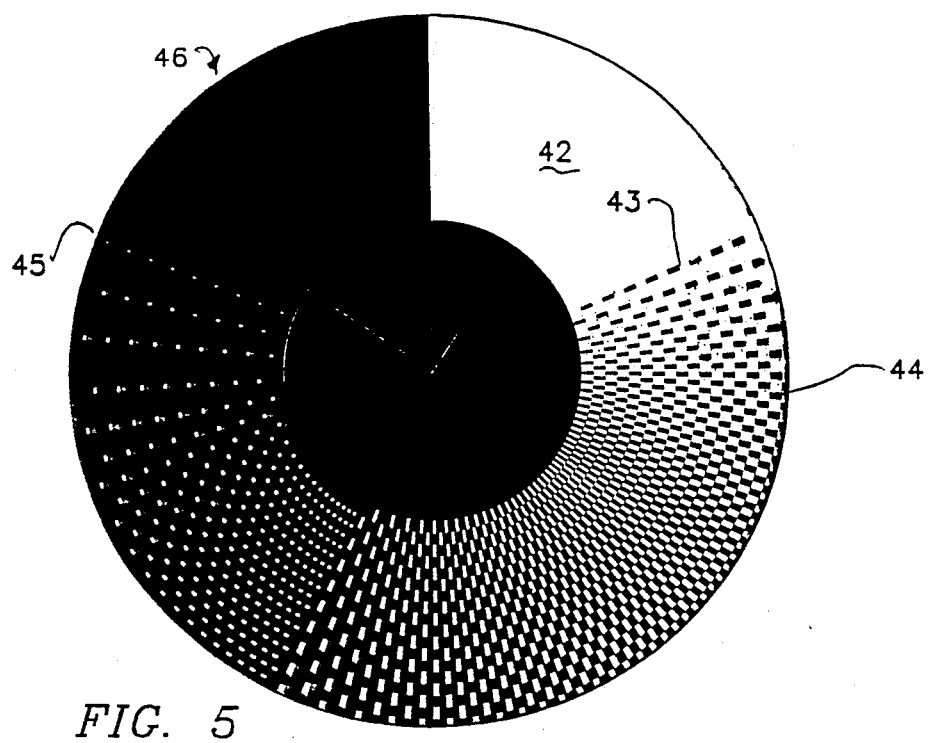
FIG. 5 illustrates an example pattern of filtering material for attenuating light in direct linear proportion to the length of an arcuate gradient axis across the pattern.

FIG. 5 shows an example pattern of variably configured disjoint discrete and connected background regions of filtering material. Alternately, dots or other pattern shapes could be used, and non-linear variations in filtering effect along the length of the surface could be compensated for by positioning the filter elements under computer control (not shown).

Figure 6:
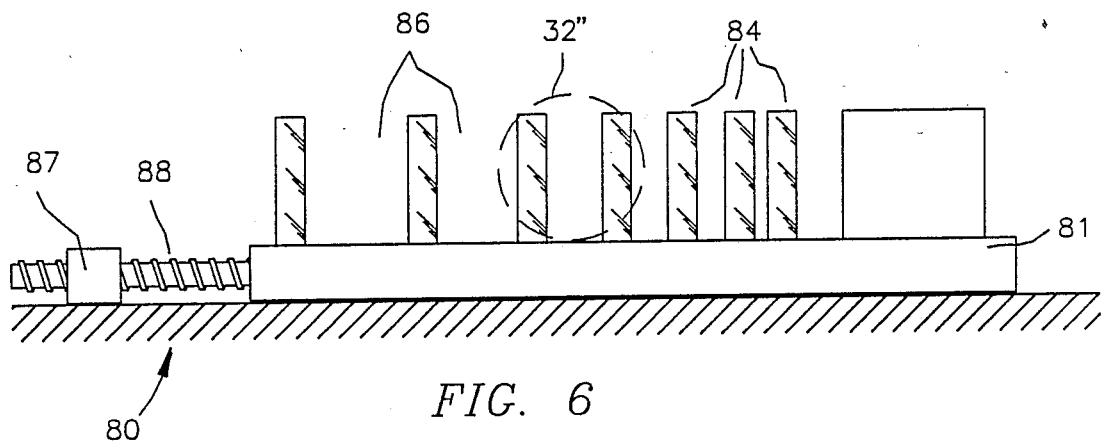
FIG. 6 illustrates a second embodiment of a filter element according to the present invention in the form of a straight strip.

FIG. 6 shows a second embodiment of a filter element 80 in the form of a base 81 holding substrate means including discrete regions 84 of filtering material and separated by continuously varying width clear areas 86. Note that the spacings of regions 86 between the bar-shaped regions 84 decrease from one end to the other of a gradient axes along the elongated base 81. A spectral filter in this embodiment would use linear actuators such as motors 87 and lead screws 88 supported in a casing (not shown) to position filter element 80 so that a selected area of its surface as illustrated by dashed circle 32" is intersected by the beam.

Figure 7:
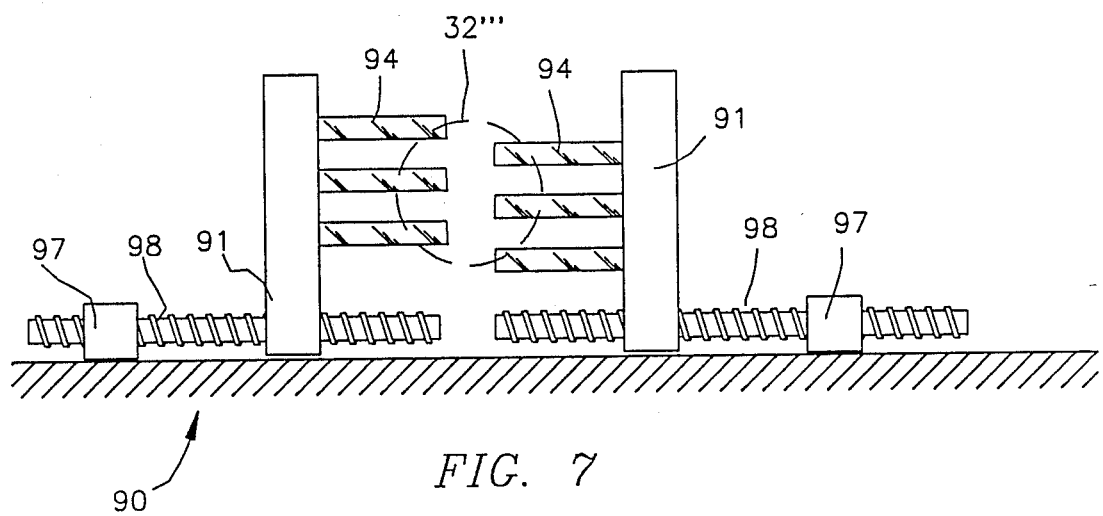
FIG. 7 illustrates a third embodiment of a filter element according to the invention in the form of substrate means including a pair of planar surface areas and which are supported on diametrically opposite sides of a beam and movable towards and away from the beam axis to substantially uniformly attenuate the color of the beam of light.

FIG. 7 shows a third embodiment of a filter element 90 in the form of a pair of filter element bases 91 supporting preferably equally spaced elongated planar surface areas 94 covered with filter material, which are driven for example by motors 97 and lead screws 98 to be inserted from diametrically opposite sides into the cylindrical region 32''' intersected by a light beam. In an alternate embodiment, each bar of filtering material 94 is formed on a separate substrate which is disposed in cantilever relationship with one of bases 91, and which may have a different width.

In operation to produce given colors and/or intensities in light beams projected along optical axis OA in the generally cylindrical region 32 through filter module 20, drive motors 26a, 26b, 26c (not shown) and 26d are individually activated. At different times different selected potions of the surface of each element are intersected by the beam. Motors 26 turn respective pulleys 27 which drive belts 25 to rotate disks 22 through angles as sensed by potentiometers 28 to positions where each filter disk 22 has a surface portion with a predetermined filter density pattern in the cylindrical region 32 intersected by light along axis OA. The three color filter element's positions determine the relative proportions of the three primary color components of the beam. The fourth disk 22 is positioned as desired to dim the overall intensity of the light beam. Alternately, instead of using a fourth disk, the three color disks may be individually rotated as appropriate to maintain the relative balance of color in the projected beam while varying its overall intensity.

Although the present invention has been described in preferred embodiments, it will be appreciated by those skilled in the art that these embodiments may be modified without departing from the essence of the invention. The filters may be used for example in photography, video or graphics systems. It is therefore intended that the following claims be interpreted as covering any modifications falling within the true scope and spirit of the invention.

I claim:

1. Spectral filter means for filtering light projected in a beam along an optical axis, comprising a component color filter element including substrate means having a patterned portion formed by discrete regions occupying interstices of a background region, either said discrete regions or said background region being coated with dichroic filtering material of a given characteristic in a pattern in which beam-size areas have average densities of filtering material chosen to attenuate, by predetermined proportions, the avrage color saturation of beams of light passing along said optical axis and intersecting those areas.

2. Spectral filter means as in claim 1 wherein said background and discrete regions of filtering material form a pattern which varies generally continuously along a gradient axis such that different beam-size areas around successive points along said gradient axis have different average densities of said filtering material to attenuate, by correspondingly varying predetermined different proportions, the color of said beam of light.

3. Spectral filter means as in claim 2 wherein said patter of filtering material is arranged to increasingly attenuate light in linear proportion to increasing distance along the length of said gradient axis.

4. Spectral filter means as in claim 2 wherein said substrate means has an elongated planar surface and wherein said pattern of one or more regions of filtering material partially covers surface areas around successive points along a length of said gradient axis at least twice the diameter of said beam.

5. Spectral filter means as in claim 4 wherein said substrate means, except where coated with said filtering material, is relatively transparent.

6. Spectral filter means as in claim 4 wherein said substrate means comprises rectilinear strip and said gradient axis is a straight line segment parallel to the length of said strip.

7. Spectral filter means as in claim 4 and further comprising actuator means for selectively moving said substrate means along the plane of its surface to a position where said surface has a selected area intersected by light in a beam along said optical axis.

8. Spectral filter means as in claim 7 and comprising a plurality of said component filter elements each having said dichroic filtering material with a respective different subtractive primary color characteristic and being independently and simultaneously positionable with its surface in a respective plane spaced from, and parallel to, the said surfaces of the other component filter elements.

9. Spectral filter means as in claim 8 wherein each said substrate means comprises a circular disk, its said surface is elongated along an arcuate gradient axis concentric with the center point of said disk, and said actuator means rotates said disk parallel to the plane of its surface around its center point.

10. Spectral filter means as in claim 9 wherein said disks are each centered around one or another of a plurality of rotation axes parallel to said optical axis.

11. Spectral filter means as in claim 10 comprising four component filter element disks which are grouped in a first coaxial pair of disks centered about a first rotation axis parallel to one side of said optical axis, and in a second coaxial pair of disks centered about a second rotation axis parallel to a second side of said optical axis, such that at all times some portion of the area of each disk is intersected by light in a beam along said optical axis.

12. Spectral filter means for filtering light projected in a beam along an optical axis, comprising three component hue filter elements each including substrate means having a gradient axis through a patterned portion formed by discrete regions occupying interstices of a background region, either said discrete regions or said background region having a given primary subtractive primary color filtering material in a pattern in which beamsize areas around successive points along said gradient axis have respective average densities of filtering material chosen to attenuate, by predetermined proportions, the average color of beams of light passing along said optical axis and serially intersecting those areas of each said filter element.

13. In a lighting system of the type including
a light source for radiating light in a beam along an optical axis,
spectral filter means, and
lens means for projecting light in said beam;
improved spectral filter means characterized in that said improved spectral filter means comprises:
a plurality of component color filter elements each including distinct regions of a selected different characteristic filtering material spaced in a respective plane generally out of focus so as to approximately uniformly attenuate by a predetermined amount the color of a beam of light intersecting an area of said regions of filtering material, each said filter element being independently movable parallel to the plane of its filtering material to a position where selected regions of said filtering material are intersected by light in said beam; and
actuator means for selectively moving each said component color filter element parallel to the plane of its filtering material for a selected area of each said element to be intersected by light in said beam in series with selected areas of each other said element being likewise intersected to thereby selectively attenuate spectral components of light in said beam.

14. Light filter means for selectably varying in color of light projected in a beam along an optical axis, comprising:
three component filter means including respective substrate means each having a filter material-supporting surface of which a patterned portion includes a plurality of discrete areas which vary in size and/or spacing along a gradient axis extending across said patterned portion, either said plurality of discrete areas or the intersticial areas between said discrete areas being coated with a respective subtractive primary hue dichroic filter material and the other areas not being coated with filter material, such that a beam of light passed through one said patterned portion will have that component hue with a saturation which varies depending upon the point at which said gradient axis is intersected by said optical axis; and
actuator means for independently moving each said substrate means in a different plane in directions along its gradient axis to positions where its patterned portion has some selected average density of filtering material area intersected by light in a beam passing along said optical axis;
whereby corresponding proportions of hues complementary to each said hue will be serially subtracted from the beam to yield corresponding saturations of the respective hues combined in the beam of light downstream.

15. Means for selectably varying the color of light projected in a beam along an optical axis, comprising:
filter means including substrate means having a filter material-supporting surface of which a patterned portion includes a plurality of discrete areas coated with a pre-selected hue dichroic filter material, said discrete areas varying in size and/or spacing along a gradient axis extending across said patterned portion such that a beam of light passed through said patterned portion will have the color of said pre-selected hue with a saturation which varies depending upon the point at which said gradient axis is intersected by said optical axis.

16. Means as recited in claim 18 wherein said filter materials supporting surface further comprises:
a first portion including an area coated with said filter material at a first end of said gradient axis whereby a beam of light passed through said first portion will have the color of said pre-selected hue with a high saturation; and
a second portion including an un-coated area at a second end of said gradient axis whereby a beam of light passed through said second portion will have a low saturation.

17. Means for selectably varying the color of light projected in a beam along an optical axis, comprising:
filter means including substrate means having a filter material-supporting surface of which a patterned portion is coated with a pre-selected hue dichroic filter material, except in a plurality of discrete transparent un-coated areas, said discrete areas varying in size and/or spacing along a gradient axis extending across said patterned portion such that a beam of light passed through said patterned portion will have the color of said preselected hue with a saturation which varies depending upon the point at which said gradient axis is intersected by said optical axis.

18. Means as recited in claim 17 wherein said filter material-supporting surface further comprises:
a first portion including an area coated with said filter material at a first end of said gradient axis whereby a beam of light passed through said first portion will have the color of said pre-selected hue with a high saturation; and
a second portion including an un-coated area at a second end of said gradient axis whereby a beam of light passed through said second portion will have a low saturation.

19. Light filter means for selectably varying the color of light passing in a beam along an optical axis, comprising:
three component filter means including respective substrate means each having a surface which has a gradient axis and includes
a first end portion coated with a respective subtractive primary hue dichroic filter material in a uniform concentration at a first end of said gradient axis;
a second end portion not coated with filter material at a second end of said gradient axis; and
a patterned area formed by a first pattern portion comprising a connected region and a second pattern portion comprising a plurality of discrete disjoint regions which are located in connected region interstices occupying predetermined continuously varying percentages of successive beam-size areas around successive points along said gradient axis between said end portions, one of said pattern portions being coated with said respective due dichroic filter material in said uniform concentration, such that said dichroic filter material has a monotonically graded average density in successive beam-size areas around successive points along said gradient axis in said patterned area;
said three substrate means being concurrently movable in directions along their respective gradient axes to position selected average density filter material areas simultaneously in respective planes across said optical axis to be serially intersected by light in a beam from which said component filter means subtracts corresponding selected proportions of complementary hues to thereby yield corresponding saturations of the respective hues combined in the beam of light downstream.

20. Spectral filter means as in claim 12 and further comprising:
actuator means for independently moving each said substrate means in a different plane in directions along its gradient axis to positions where its patterned portion has some selected average density of filtering material area intersected by light in a beam passing along said optical axis.

* * * * *